US009669818B2

(12) United States Patent
Kull et al.

(10) Patent No.: US 9,669,818 B2
(45) Date of Patent: Jun. 6, 2017

(54) METHOD FOR DETECTING LEAKS IN A BRAKE PRESSURE LINE, UNDER BRAKING PRESSURE, OF A RAIL VEHICLE

(71) Applicant: KNORR-BREMSE SYSTEME FÜR SCHIENENFAHRZEUGE GMBH, Munich (DE)

(72) Inventors: Alexander Kull, Munich (DE); Bodo Minnecker, Munich (DE); Daniel Feucht, Sauerlach (DE)

(73) Assignee: KNORR-BREMSE SYSTEME FUR SCHIENENFAHRZEUGE GMBH (DE)

( * ) Notice: Subject to any disclaimer, the term of this patent is extended or adjusted under 35 U.S.C. 154(b) by 156 days.

(21) Appl. No.: 14/413,018

(22) PCT Filed: Jul. 5, 2013

(86) PCT No.: PCT/EP2013/064223
§ 371 (c)(1),
(2) Date: Jan. 6, 2015

(87) PCT Pub. No.: WO2014/006174
PCT Pub. Date: Jan. 9, 2014

(65) Prior Publication Data
US 2015/0166033 A1 Jun. 18, 2015

(30) Foreign Application Priority Data
Jul. 6, 2012 (DE) .......................... 10 2012 013 521

(51) Int. Cl.
*B60T 17/22* (2006.01)
*G01M 3/26* (2006.01)
(Continued)

(52) U.S. Cl.
CPC .......... *B60T 17/221* (2013.01); *B60T 17/228* (2013.01); *G01L 5/28* (2013.01); *G01M 3/26* (2013.01);
(Continued)

(58) Field of Classification Search
CPC .... B60T 17/228; B60T 17/221; B60T 8/3235; G01M 3/26; G01M 3/28; G01M 17/08; G01L 5/28
(Continued)

(56) References Cited

U.S. PATENT DOCUMENTS 4,538,228 A * 8/1985 Brearey ................ B60T 8/1705
303/122.09
5,722,736 A * 3/1998 Cook .................... B60T 17/228
303/15
(Continued)

FOREIGN PATENT DOCUMENTS

DE 1080588 B 4/1960
DE 3704826 A1 8/1988
(Continued)

OTHER PUBLICATIONS

English Translation of Notification Concerning Transmittal of International Preliminary Report on Patentability and Written Opinion of the International Search Authority for International Patent Application No. PCT/EP2013/064223, dated Jul. 5, 2013.
(Continued)

*Primary Examiner* — Thomas Irvin
(74) *Attorney, Agent, or Firm* — Barnes & Thornburg LLP

(57) ABSTRACT

A method for detecting leaks in at least one brake pressure line, under braking pressure, of a compressed air brake device of a rail vehicle having an indirect electro-pneumatic brake, wherein the indirect electro-pneumatic brake has a
(Continued)

master air vessel line to hold a master air vessel line pressure, and a compressed air source supplying the master air vessel line with compressed air and is controlled by the master air line pressure in a master air line, wherein the at least one brake pressure line under braking pressure extends between a valve device, which controls the braking pressure in dependence upon the master air line pressure in the master air line, and at least one brake actuator, and where the braking test method is carried out when the rail vehicle is stationary.

13 Claims, 1 Drawing Sheet

(51) Int. Cl.
*G01L 5/28* (2006.01)
*G01M 17/08* (2006.01)
*G01M 3/28* (2006.01)
*B60T 8/32* (2006.01)

(52) U.S. Cl.
CPC .............. *G01M 3/28* (2013.01); *G01M 17/08* (2013.01); *B60T 8/3235* (2013.01)

(58) Field of Classification Search
USPC ........................................ 303/3, 7, 128, 132
See application file for complete search history.

(56) References Cited

U.S. PATENT DOCUMENTS

| | | | | |
|---|---|---|---|---|
| 5,924,774 | A * | 7/1999 | Cook | B60T 13/665 303/115.2 |
| 5,927,823 | A * | 7/1999 | Dimsa | B60T 13/665 303/15 |
| 6,250,723 | B1 * | 6/2001 | Barberis | B60T 8/3235 303/15 |
| 6,626,506 | B2 * | 9/2003 | Kettle, Jr. | B60T 13/665 303/15 |
| 6,824,226 | B2 * | 11/2004 | Smith, Jr. | B60T 11/32 303/15 |
| 8,922,385 | B2 * | 12/2014 | Brown | B61L 15/0054 246/169 R |
| 2011/0095880 | A1 * | 4/2011 | Gaughan | B60T 17/228 340/453 |

FOREIGN PATENT DOCUMENTS

| | | |
|---|---|---|
| DE | 102007025835 A1 | 12/2008 |
| DE | 102010048818 A1 | 4/2012 |
| EP | 1634790 A1 | 3/2006 |
| EP | 1995140 A2 | 11/2008 |

OTHER PUBLICATIONS

Search Report for International Patent Application No. PCT/EP2013/064223; Oct. 23, 2013.

* cited by examiner

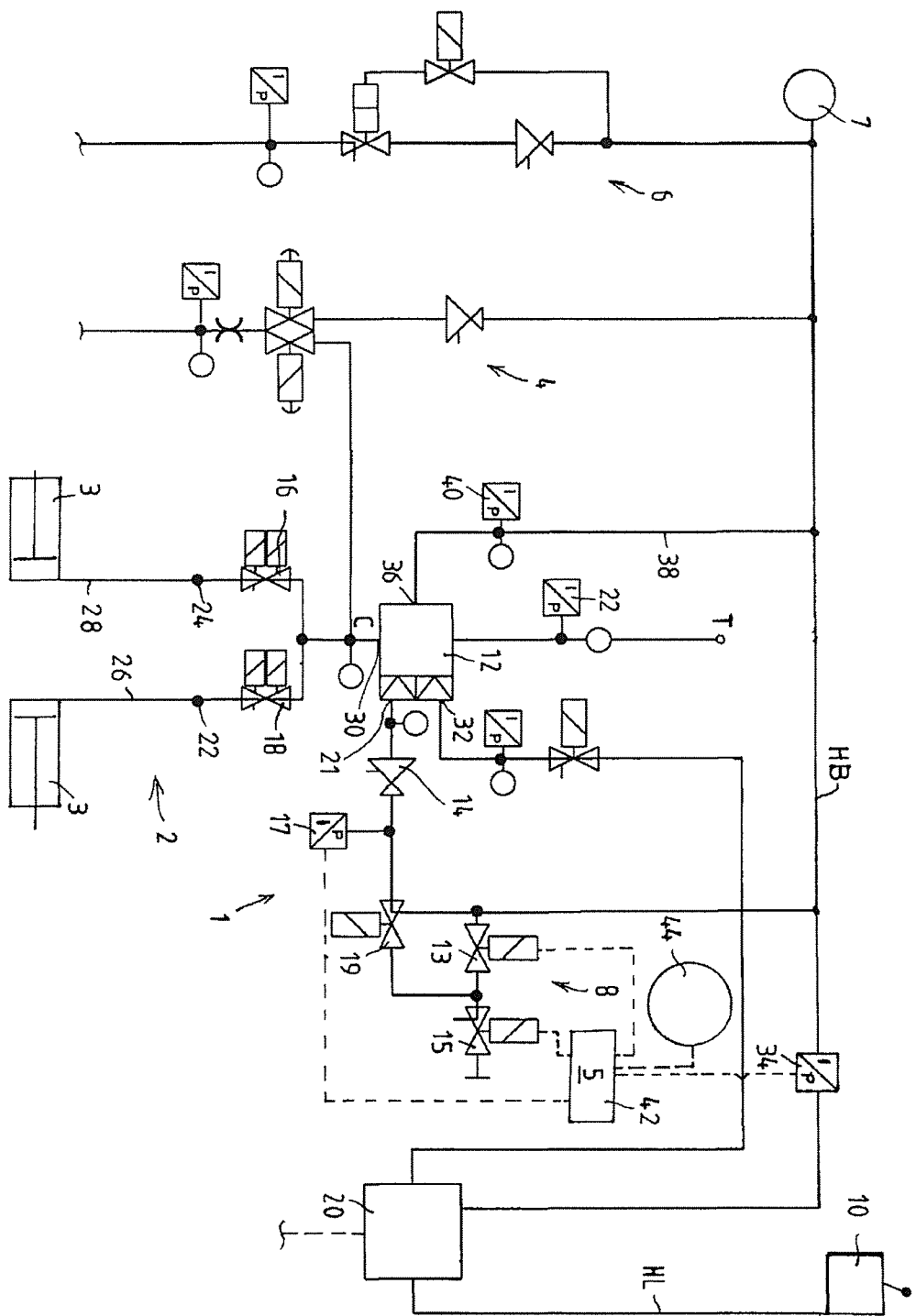

METHOD FOR DETECTING LEAKS IN A BRAKE PRESSURE LINE, UNDER BRAKING PRESSURE, OF A RAIL VEHICLE

PRIORITY CLAIM

This patent application is a U.S. National Phase of International Patent Application No. PCT/EP2013/064223, filed 5 Jul. 2013, which claims priority to German Patent Application No. 10 2012 013 521.1, filed 6 Jul. 2012, the disclosures of which are incorporated herein by reference in their entirety.

FIELD

Disclosed embodiments relate to a method for identifying leaks in a brake pressure line, under braking pressure, of a pneumatic brake device of a rail vehicle comprising an indirect electro-pneumatic brake.

BACKGROUND

In known electro-pneumatic brakes the braking pressure of each bogie, which bogie usually comprises two braked axles and two or more pneumatically actuated brake cylinders for each axle, is monitored using a pressure sensor which is connected downstream of a unitary pressure intensifier (EDU) may be a relay valve. As a result of this arrangement, however, even relatively major leaks in the brake pressure lines under braking pressure are not detected. The cause of this is to be seen in the replenishment output of the unitary pressure intensifier (EDU), which replenishes the brake pressure lines with compressed air in the event of leaks but thereby makes it more difficult to identify a loss of braking pressure. This is problematic since a braking pressure loss cannot be detected reliably. It must also be assumed here that not only the brake cylinder affected by the leak in the associated brake pressure line becomes inoperative but the further coupled brake cylinders of the bogie are at least partially vented via the leak.

SUMMARY

In view of the above, disclosed embodiments provide a method with which leaks in brake pressure lines and brake pressure hoses under braking pressure can be detected reliably with the lowest cost and complexity.

BRIEF DESCRIPTION OF THE FIGURES

An exemplary embodiment is represented in the drawing and is explained in more detail in the following description. In the drawing a single FIGURE shows a circuit diagram of an electro-pneumatic compressed air brake device.

DETAILED DESCRIPTION OF THE DISCLOSED EMBODIMENTS

The disclosed embodiments are based on the concept that brake tests which are to be carried out in any case for safety reasons, in the course of which an application of at least one brake actuator by an indirect electro-pneumatic brake takes place, are used at the same time to detect and identify leaks in lines under braking pressure during this brake test.

Disclosed embodiments provide a method for identifying leaks in at least one brake pressure line under braking pressure of a pneumatic brake device of a rail vehicle comprising an indirect electro-pneumatic brake is proposed, which indirect electro-pneumatic brake has a main air reservoir line for carrying a main air reservoir line pressure and a compressed air source supplying the main air reservoir line with compressed air and is controlled by the main air line pressure in a main air line, the at least one brake pressure line which is under the braking pressure extending between a valve device, which modulates the braking pressure in the main air line pressure in the main air line, and at least one brake actuator, and the method including a brake test carried out with the rail vehicle stationary and comprising at least the following steps:

a) checking whether the main air reservoir line pressure exceeds a predefined limit value when the replenishment of compressed air from the compressed air source to the main air reservoir line is cut off and, if this is the case, b) controlling the main air line pressure in the main air line so as to apply the at least one brake actuator, at least the following further steps being carried out in the course of the brake test:

c) monitoring the main air reservoir line pressure to determine whether c1) the value of the main air reservoir line pressure established after the application of the at least one brake actuator deviates by more than a predefined difference from a predefined plausible value for the main air reservoir line pressure, and/or c2) the pressure gradient of the main air reservoir line pressure exceeds a predefined pressure gradient in the interval between the start and the end of the application of the at least one brake actuator, and d) if c1) and/or c2 applies, generating an error message that a leak is present in the at least one brake pressure line.

There is further proposed a pneumatic brake device of a rail vehicle including such an indirect electro-pneumatic brake for carrying out this method, comprising a) at least one device for detecting the main air reservoir line pressure, b) an evaluation device which is configured such that it carries out at least the steps c) and d) of the method in the course of a brake test carried out with the rail vehicle stationary, c) at least one display for displaying the error message or a diagnostic memory for storing the error message.

The background of the above is that, in the event of a leak in a brake pressure line under braking pressure, the main air reservoir line pressure drops significantly at the same time as the braking pressure, because the braking pressure is derived from the main air reservoir line pressure, or because a pneumatic connection is created between the brake pressure lines and the main air reservoir line when the indirect electro-pneumatic brake is applied.

Because the brake pressure lines in the bogies may be flexible brake pressure hoses which are exposed to environmental influences and run between connections on the bogie, arranged downstream of the control valves, and the associated brake cylinders, leaks in such brake pressure hoses are primarily to be expected.

In this case use is made in particular of a brake test in which an indirect electro-pneumatic brake is activated, or the brake cylinders are applied, because the indirect brake is used as a rule for rapid braking with high consumption of compressed air during which leaks in brake pressure lines manifest themselves especially significantly.

It is essential here, to avoid falsifying the measuring result, that replenishment of compressed air by the compressed air source is shut off in particular in the course of the brake test, and that monitoring of the main air reservoir line pressure with a view to detecting a leak in the brake pressure line takes place only when the pressure has exceeded a certain limit value. Under such conditions it is ensured, on the one hand, that sufficient main air reservoir line pressure is present to enable detection of significant deviations from expected values with regard to pressure gradient or pressure difference, and therefore to be able to identify the fault "Leak in brake pressure line" with sufficient certainty.

As compared to solutions in which a separate pressure sensor is incorporated in each brake pressure line carrying braking pressure, which would mean four such pressure sensors together with cabling for each bogie, the disclosed embodiments utilize a pressure sensor which is usually already present in the main air reservoir line HB.

Optionally, it is provided that the brake test is carried out manually, in a user-guided manner or automatically, and that during the brake test the main air line pressure in the main air line HL is controlled at least periodically so as to apply the at least one brake actuator.

In general, before a train consisting of rail vehicles, or a rail vehicle, leaves a starting station, a brake test is performed with the rail vehicle stationary but in operational readiness. The brake test is repeated each time the driver's cab in the traction vehicle is changed or the train of rail vehicles is lengthened or divided. The task of the brake test is generally performed by authorized brake personnel who have received special training.

In a manual brake test, the necessary work steps are performed manually and checked visually. In the case of the user-guided brake test the work steps listed in a notice in the driver's cab are performed manually and the results displayed for visual checking. In the case of an automatic brake test the work steps and the checking of the results are carried out automatically.

A distinction is further made between full and simplified brake tests. In the full brake test the state of the brakes of all the vehicles must be determined. In the simplified brake test it must be determined whether the continuity of the main air line, of the main air reservoir line and of the electric brake lines is established up to the last rail vehicle of the train, and that the brakes can be applied and released from the leading vehicle. In addition, in a driver's cab brake test or a turning brake test, the functioning of the driver's brake valve in the leading vehicle is tested.

The defects and damage identified in the course of the brake test must be recorded by labelling or suitable documentation, or by inputting to a diagnostic system.

Each of the above-mentioned brake tests may be used to detect or identify a leak in brake pressure lines under braking pressure while observing the main air reservoir line pressure. Optionally, the brake test is a brake test according to the standard UIC 612-1, chapter 4.1.3.1, the content of which is expressly incorporated here with respect to brake tests.

During the brake test an electro-pneumatic control of the main air line pressure in the main air line HL may be shut off by a control valve arrangement including a discharge solenoid valve and a brake solenoid valve.

The error message "Leak in a brake pressure line" may be stored in a diagnostic memory, to be read out as required.

The device for detecting the main air reservoir line pressure includes, for example, at least one pressure sensor arranged in the main air reservoir line, and the evaluation device includes an electronic control unit. In addition, the compressed air source is formed by at least one compressor or a compressed air storage reservoir.

It is also optionally provided that the indirect electro-pneumatic brake further has an electro-pneumatic control for the main air line pressure in the main air line HL, which control is carried out by a control valve arrangement including a discharge solenoid valve and a brake solenoid valve, a control inlet of a unitary pressure intensifier (EDU) or relay valve being controlled by means of the main air line pressure controlled by the electro-pneumatic control device, which relay valve modulates the braking pressure delivered via the brake pressure line to the at least one brake actuator in the controlled main air line pressure.

Such a brake actuator is formed, for example, by a compressed-air actuated brake cylinder, two such brake cylinders, for example, being provided for each axle of a two-axle bogie. In this case a brake pressure line which is to be monitored with respect to braking pressure loss through leakage is formed, for example, by a brake pressure hose for supplying at least one brake actuator of an axle of a bogie having two axles with braking pressure (C).

According to at least one disclosed embodiment, the pneumatic brake device may further comprise, in addition to an indirect electro-pneumatic brake, a direct electro-pneumatic brake having an electro-pneumatic pressure regulator which, with the aid of a brake solenoid valve and a discharge solenoid valve, generates from the main air reservoir line pressure a pilot control pressure for a further control inlet of the unitary pressure intensifier (EDU) or relay valve which modulates the braking pressure (C) delivered to the at least one brake actuator in the pilot control pressure. The indirect electro-pneumatic brake and the direct electro-pneumatic brake therefore share the unitary pressure intensifier (EDU).

As is usual, in this case the indirect electro-pneumatic brake is provided for rapid braking and the direct electro-pneumatic brake for service braking. The indirect electro-pneumatic brake can further serve as a fallback level in the event of failure of the direct electro-pneumatic brake.

The FIGURE shows a circuit diagram of a portion of a disclosed embodiment of an electro-pneumatic compressed air brake system 1 of a rail vehicle or of a train formed from a plurality of rail vehicles, including a direct-acting electro-pneumatic, microprocessor-controlled brake device ("direct brake") and an indirectly-acting brake ("indirect brake").

A single rail vehicle has, for example, two bogies, a bogie 2 having, for example, two braked axles each having two pneumatically actuated brake cylinders 3. In the FIGURE only one brake cylinder 3 is represented in each case. Each bogie 2 is controlled separately, for example by a compact control module (CCM) (not shown explicitly here), so that an individual braking pressure C for four brake cylinders, for example, can be formed for each bogie 2. For this purpose an electronic brake control device 5 is integrated in each compact control module CCM. The control of the electro-pneumatic compressed air brake system is monitored and diagnosed by a higher-level brake management system which performs all the brake functions of the rail vehicle. The brake management system has the task of controlling and monitoring all the systems necessary to decelerate the vehicle. These are, individually, prioritized electrodynamic brakes which act on the drive wheel sets and are used primarily for service braking; the direct brake on trailer axles, which is used to supplement the necessary braking force during service braking; the indirect brake as the fast-acting brake or as the background safety level in the event of failure of the direct brake; the parking brake and the electromagnetic rail brake. The control valve arrangement 4 of the parking brake, not of interest here, and the control valve arrangement 6 of the electromagnetic rail brake, not of interest here, are shown in the FIGURE for the sake of completeness.

A main air reservoir line HB which is supplied with compressed air under main air reservoir line pressure by a compressed air source, for example a compressor 7, runs through the train. The main air reservoir line HB supplies the direct brake and also the indirect brake with compressed air. In addition, a main air line HL controlled by a driver's brake valve 10 and serving to control the indirect brake is present.

The direct brake is a microprocessor-controlled electro-pneumatic compressed air brake as the service brake with an electro-pneumatic pressure regulator 8, in which the electrical commands issued by a control electronics via signal lines are converted into pneumatic signals, in particular into a pilot control pressure for a relay valve, or for a unitary pressure intensifier 12, connected downstream. The electro-pneumatic pressure regulator 8 is formed by a brake solenoid valve 13 and a discharge solenoid valve 15 and by a pressure sensor 17. The brake solenoid valve 13 and the discharge solenoid valve 15 assume the function of stepless and rapid pressure increase or decrease. The pressure sensor 17 serves to measure the adjusted pilot control pressure. The electro-pneumatic EP pressure regulator 8 forms, together with the electronic brake control device 5, a pressure control loop. The adjusted pilot control pressure is supplied to a control inlet 21 of the unitary pressure intensifier 12 via a rapid-braking solenoid valve 19, maintained in an energized state during service braking, and a pressure limiting valve 14, which unitary pressure intensifier 12 may be formed by a relay valve. The pressure limiting valve 14 connected between the electro-pneumatic pressure regulator 8 and the unitary pressure intensifier 12 limits the pilot control pressure of the direct brake to a predefinable maximum pilot control pressure of the direct brake.

The mean value of the load pressures, which is supplied to the unitary pressure intensifier 12, is applied constantly at a load connection T of the unitary pressure intensifier 12. This load pressure T is measured with a pressure sensor 22 and processed by the brake control device 5.

The pilot control pressure of the direct brake applied at the one control inlet 21 of the unitary pressure intensifier 12 and the load pressure T serve as control variables for the unitary pressure intensifier 12, with the aid of which the supply pressure at the reservoir connection 36 of the unitary pressure intensifier 12, coming from a compressed air reservoir or from the main air reservoir line HB, is converted into a load-corrected and more powerful brake cylinder pressure C at the outlet connection 30. The braking pressure C is then supplied to the two brake cylinders 3 of an axle via respective anti-slip valves 16, 18. Flexible brake pressure hoses 26, 28 run in the bogie between the connections 22, 24, arranged downstream of the anti-slip valves 16, 18, and the respective brake cylinder 3. The anti-slip control on an axle of the bogie is then effected via a respective anti-slip valve 16, 18 per wheel set arranged downstream of the unitary pressure intensifier 12. The fast-acting brake or emergency brake is implemented by the hardwired rapid-braking solenoid valve 19, the microprocessor controlled electro-pneumatic pressure regulator 8 being bypassed.

During service braking only the direct brake is used, apart from the prioritized electrodynamic brake. At low speeds the friction brake takes over the entire braking force without jerks down to standstill, and then automatically sets the holding stage to prevent the vehicle from rolling back. The direct brake is used for the following purposes:

service braking (load-dependent): supplementing the electrodynamic brake with the friction brake,
holding brake (load-dependent): prevents the vehicle from rolling when at standstill,
stopping brake (load dependent): at low speeds absorption of braking force in the powered and trailer bogies,
emergency brake (load-dependent): maximum deceleration in the event of danger, with anti-slip protection and load correction via rapid-braking or emergency-braking valves on the compact control modules CCM; the direct brake also redundantly sets the corresponding braking pressure C via the electro-pneumatic pressure regulator 8.

In normal operation the indirect brake is used for rapid braking, which is executed purely pneumatically via the main air line HL. The indirect brake also serves as a fallback level in the event of failure of the direct brake and when being towed by UIC vehicles, and ensures the following functions:

couplability to UIC vehicles also having line-entry systems while maintaining braking ability,
redundant fallback level of the emergency/fast-acting brake,
redundant braking possibility in the event of failure of the brake management system to continue running and clear the line (e.g. problems in the on-board network).

In the case of the indirect brake the main air line pressure in the main air line HL is influenced via a control valve arrangement 20 including discharge solenoid valves and brake solenoid valves (not shown explicitly here). The electrical control signals for the control valve arrangement 20 are generated in the leading vehicle in parallel with the main air line pressure in the main air line HL and are transmitted via electric lines to all the rail vehicles of the train. Simultaneous activation of the control valve arrangements 20 of the indirect brakes of all the rail vehicles of the block train is thereby achieved.

In each driver's cab the driver has available the driver's brake valve 10 for actuating the indirect brake. By means of the driver's brake valve 10, the driver can steplessly vent the main air line HL and thereby reduce the pressure from 5 bar (release pressure). With a reduction by 1.5 bar the highest braking stage is reached. A further pressure reduction has no further effect. In the case of rapid or emergency braking, the main air line HL is reduced to 0 bar following UIC to shorten the braking and response times.

In normal operation the pressure in the main air line HL is held at 5 bar by means of a pressure reducing valve (not shown here) and the driver's brake valve 10. The pressure in the main air line HL may also be reduced by actuating an emergency switch button (not shown here) in the driver's cab and by de-energizing SIFA valves by opening an emergency brake loop, thereby triggering rapid or emergency braking.

The pressure reduction in the main air line HL is converted in the control valve arrangement 20, which includes a discharge solenoid valve and a brake solenoid valve, into a further pilot control pressure for a further control inlet 32 of the unitary pressure intensifier 12, which is then load-corrected and boosted by means of the unitary pressure intensifier 12. Braking can therefore be carried out in an analogue and load-dependent manner over the complete range of demands.

In the control valve arrangement 20, therefore, the main air line pressure HL (release brake=5 bar, bring into contact=pressure reduction by approximately 0.4 bar, maximum braking force=pressure reduction by 1.5 bar) is converted into a pilot control pressure for the further control inlet 32 of the unitary pressure intensifier 12 connected downstream.

Brake tests to be carried out in any case for safety reasons with the rail vehicle or rail vehicle train at standstill, in the course of which tests application of the brake cylinders 3 by means of the indirect brake takes place, are used at the same time to detect or identify, during this brake test, leaks in lines under braking pressure, in particular leaks in the brake pressure hoses 26, 28. A method for identifying leaks in the brake pressure lines 26, 28 under braking pressure is therefore proposed here, the method making use of a brake test of the indirect brake carried out with the rail vehicle stationary.

In the brake test, which may be an automatic or semi-automatic brake test following UIC 612-1, chapter 4.1.3.1, it is first tested whether the main air reservoir line pressure, optionally measured here directly in the main air pressure reservoir line HB by a pressure sensor 34, exceeds a predefined limit value, for example 7.8 105 Pa (7.8 bar), when the replenishment of compressed air from the compressor 7 to the main air reservoir line HB is cut off. As the main air reservoir line pressure is also present in further pressure lines or connections, for example in the pressure line 38 leading from the main air reservoir line HB to the reservoir connection 36 of the unitary pressure intensifier 12, it might also be measured by a pressure sensor 40 present in that line in any case.

If the main air reservoir line pressure exceeds the predefined limit value, according to the brake test the main air line pressure in the main air line HL is controlled to apply the indirect brake or the brake cylinders. The application of the brake cylinders 3 always forms part of a brake test.

Going beyond the further measures carried out in the course of the brake test, or in addition to the measures carried out in the course of the brake test, the method provides that the main air reservoir line pressure is monitored by the pressure sensor in the main air reservoir line HB to determine whether the value of the main air reservoir line pressure established after the application of the brake cylinders 3 deviates by more than a predefined difference from a predefined plausible or expected value for the main air reservoir line pressure. Alternatively or additionally, the main air reservoir line HB may be monitored to determine whether the pressure gradient of the main air reservoir line pressure exceeds a predefined pressure gradient in the interval between the start and the end of the application of the brake cylinders 3 or of the indirect brake.

If one and/or the other case applies, this indicates an unusual drop in the main air reservoir line pressure. For this implies, after checking has already taken place, that the main air reservoir line pressure has exceeded a predefined limit value prior to the application of the indirect brake, that the unusual pressure drop or pressure gradient is to be explained by a leak in one of the brake pressure lines. The main air reservoir line pressure captured by the pressure sensor 34 is evaluated with respect to the above-mentioned criteria in an evaluation device 42 and, if one or both cases applies, generates an error message which points to a leak in one or more brake pressure hoses 26, 28. As the brake pressure hoses 26, 28, which run between the connections 22, 24 arranged on the bogie downstream of the anti-slip valves 16, 18 and the associated brake cylinders 3, are exposed to severe environmental influences, leaks in these brake pressure hoses 26, 28 are primarily to be expected. The evaluation device 42 or its software routine may be integrated in the brake control device 5 of the direct brake. The error message generated in the evaluation device is then displayed on a display 44 in the driver's cab and/or is stored in a diagnostic memory to be read out.

LIST OF REFERENCE NUMERALS

1 Brake system
2 Bogie
3 Brake cylinder
4 Control valve arrangement
5 Brake control device
6 Control valve arrangement
7 Compressor
8 Pressure regulator
10 Driver's brake valve
12 Unitary pressure intensifier
13 Brake solenoid valve
14 Pressure limiting valve
15 Discharge solenoid valve
16 Anti-slip valve
17 Pressure sensor
18 Anti-slip valve
19 Rapid-braking solenoid valve
20 Control valve arrangement
21 Control inlet
22 Connection
24 Connection
26 Brake pressure hose
28 Brake pressure hose
30 Outlet connection
32 Control inlet
34 Pressure sensor
36 Reservoir connection
38 Pressure line
40 Pressure sensor
42 Evaluation device
44 Display

The invention claimed is:

1. A method for detecting leaks in at least one brake pressure line, under braking pressure, of a pneumatic brake device of a rail vehicle that includes an indirect electro-pneumatic brake, which indirect electro-pneumatic brake has a main air reservoir line for carrying a main air reservoir line pressure and a compressed air source supplying the main air reservoir line with compressed air and is controlled by the main air line pressure in a main air line, the at least one brake pressure line which is under the braking pressure extending between a valve device which modulates the braking pressure in dependence on the main air line pressure in the main air line and at least one brake actuator, the method comprising:

checking whether the main air reservoir line pressure exceeds a predefined limit value when the replenishment of compressed air from the compressed air source to the main air reservoir line is cut off and, in response to the main air reservoir line pressure exceeding a predefined limit value, controlling the main air line pressure in the main air line so as to apply the at least one brake actuator;

monitoring the main air reservoir line pressure to determine whether the value of the main air reservoir line pressure established after the application of the at least one brake actuator deviates by more than a predefined difference from a predefined plausible value for the main air reservoir line pressure, and/or whether the pressure gradient of the main air reservoir line pressure exceeds a predefined pressure gradient in the interval between the start and the end of the application of the at least one brake actuator; and generating an error message indicating a leak is present in the at least one brake pressure line in response to the value of the main air reservoir line pressure established after the application of the at least one brake actuator deviating by more than the predefined difference from a predefined plausible value for the main air reservoir line pressure, and/or the pressure gradient of the main air reservoir line pressure exceeds the predefined pressure gradient in the interval between the start and the end of the application of the at least one brake actuator, wherein the checking and monitoring are performed while the rail vehicle is stationary.

2. The method of claim 1, wherein the checking and monitoring are carried out manually, in a user-guided manner or automatically, during which the main air line pressure in the main air line is controlled at least periodically so as to apply the at least one brake actuator.

3. The method of claim 1, wherein during the brake test an electro-pneumatic control of the main air line pressure in the main air line is shut off by a control valve arrangement including a discharge solenoid valve and a brake solenoid valve.

4. The method of claim 1, wherein the error message is displayed on a display and/or is stored in a diagnostic memory.

5. A pneumatic brake device of a rail vehicle including an indirect electro-pneumatic brake claim 1 for carrying out the method as claimed in claim 1, the brake device comprising:

at least one device for detecting the main air reservoir line pressure, an evaluation device which is configured such that it monitors the main air reservoir line pressure to determine whether the value of the main air reservoir line pressure established after the application of the at least one brake actuator deviates by more than a predefined difference from a predefined plausible value for the main air reservoir line pressure, and/or whether the pressure gradient of the main air reservoir line pressure exceeds a predefined pressure gradient in the interval between the start and the end of the application of the at least one brake actuator, and generates an error message indicating a leak is present in the at least one brake pressure line in response to the value of the main air reservoir line pressure established after the application of the at least one brake actuator deviating by more than the predefined difference from a predefined plausible value for the main air reservoir line pressure, and generates an error message indicating a leak is present in the at least one brake pressure line in response to the pressure gradient of the main air reservoir line pressure exceeding the predefined pressure gradient in the interval between the start and the end of the application of the at least one brake actuator, in the course of a brake test carried out with the rail vehicle stationary, and at least one display for displaying the error message or a diagnostic memory for storing the error message.

6. The pneumatic brake device of claim 5, wherein the device for detecting the main air reservoir line pressure includes at least one pressure sensor arranged in the main air reservoir line.

7. The pneumatic brake device of claim 5, wherein the evaluation device is formed by an electronic control unit.

8. The pneumatic brake device of claim 5, wherein the compressed air source is at least one compressor or a compressed air storage reservoir.

9. The pneumatic brake device of claim 5, wherein the indirect electro-pneumatic brake further has an electro-pneumatic control of the main air line pressure in the main air line, which control is carried out by a control valve arrangement including a discharge solenoid valve and a brake solenoid valve, a control inlet of a relay valve being controlled by the main air line pressure controlled by the electro-pneumatic control device, which relay valve modulates the braking pressure delivered via the at least one brake pressure line to the at least one brake actuator in dependence on the controlled main air line pressure.

10. The pneumatic brake device of claim 9, wherein the at least one brake pressure line is formed by a brake pressure hose for supplying the at least one brake actuator of an axle of a bogie having two axles with braking pressure.

11. The pneumatic brake device of claim 9, wherein at least one anti-slip valve is arranged between the relay valve and the at least one brake actuator.

12. The pneumatic brake device of claim 5, further comprising a direct electro-pneumatic brake having an electro-pneumatic pressure regulator which, with the aid of a brake solenoid valve and a discharge solenoid valve, generates from the main air reservoir line pressure a pilot control pressure for a further control inlet of the relay valve, which relay valve modulates the braking pressure delivered to the at least one brake actuator in dependence on the pilot control pressure.

13. The pneumatic brake device of claim 12, wherein the indirect electro-pneumatic brake is provided for rapid braking and the direct electro-pneumatic brake is provided for service braking.

* * * * *